ELECTRONIC DATA PLOTTER

Filed Nov. 30, 1965 3 Sheets-Sheet 1

William W. Witt
Paul E. Madeley
INVENTORS

BY
Arnold and Roylance
ATTORNEYS

Sept. 2, 1969 W. W. WITT ET AL 3,465,295

ELECTRONIC DATA PLOTTER

Filed Nov. 30, 1965 3 Sheets-Sheet 2

William W. Witt
Paul E. Madeley
INVENTORS

BY
Arnold and Roylance
ATTORNEYS

William W. Witt
Paul E. Madeley
INVENTORS

BY
Arnold and Roylance
ATTORNEYS

United States Patent Office 3,465,295

Patented Sept. 2, 1969

3,465,295

ELECTRONIC DATA PLOTTER

William W. Witt and Paul E. Madeley, Houston, Tex., assignors to Geo Space Corporation, Houston, Tex., a corporation of Texas Filed Nov. 30, 1965, Ser. No. 510,588
Int. Cl. G11b 7/26
U.S. Cl. 340—172.5 19 Claims

ABSTRACT OF THE DISCLOSURE

An apparatus for pictorially displaying intelligence information on a recording medium, said information being provided in digital form by a computer. A transducer controlled by logic circuits means for impinging discrete progressive images whereby the intelligence information is consecutively reproduced on the recording medium. Synchronizing means are provided to synchronize the movement of the recording medium, the timing of the logic circuit means, and the operation of the transducer.

This invention relates to electronic data plotters and more specifically to electronic data plotters that present a pictorial display image from binary-type computer data.

Heretofore, when it has been a requirement to produce a readout suitable for visual presentation in clear language from computer-type data, keyboard equipment, similar to a typewriter, has been used to produce the desirable copy. Also, heretofore, when it has been necessary to develop a pictorial display from such data other than that which could be represented by letters and numbers, electronically-controlled, mechanical X–Y plotters have been employed, even though the speed of such plotter operation is limited by the mechanical operations performed by such equipment which is much slower than that achieved by purely electrical operations. Hence, the subsequent production of a display image is much slower than the capacity at which the computer is capable of supplying data information.

The invention herein disclosed is an apparatus suitable for converting computer-stored incremental data into a permanent pictorial-type display by nearly purely electronic means and operating at speeds comparable to the time rates at which conventional computers can produce typical programmed, binary data bits. Such displays may be of letters, numbers, diagrams, pictures or any other desired two-tone presentation representable by a pattern of dots capable of assuming a variety of shades of gray.

The resulting display from a preferred embodiment of this invention is a graphical representation on a photosensitive paper produced upon that paper while it is on a turning drum upon which the display image from a beam emitting transducer such as an oscilloscope is progressively developed.

Therefore, a purpose of this invention is to provide an improved computer-output driven pictorial displaying apparatus capable of operating at speeds comparable to the speeds at which binary-bit data is made available at the output of the computer.

Another purpose of this invention is to provide an improved method of pictorially displaying binary-bit information from a computer using a changing transducer image to progressively project an image on a recording medium moving relative thereto.

Still another purpose of this invention is to provide an improved pictorial displaying apparatus controlled by binary-bit data from a computer utilizing logic-type circuits for progressively creating a display on an oscilloscope disposed to project the display to a moving photosensitive medium.

Yet another purpose of this invention is to provide an improved computer-output driven pictorial displaying apparatus comprising an oscilloscope disposed opposite a rotating drum having a photosensitive periphery wherein an image is progressively produced in sequential strips around the periphery of the drum.

Other purposes and advantages of this invention will be apparent from the description of the invention herein with reference to the illustrations. Also, more particular description of the invention may be had by reference to the embodiments thereof which are illustrated in the appended drawings, which form a part of this specification. It is to be noted, however, that the appended drawings illustrate only typical embodiments of the invention and therefore are not to be considered limiting of its scope for the invention will admit to other equally effective embodiments.

Generally, a preferred embodiment of the electronic pictorial plotter made in accordance with this invention may be characterized as comprising logic means for receiving in parallel programmed, binary-bit data information from the output interface of a computer and, upon command, transferring this data as on/off data to the intensity control circuit or Z-axis of an oscilloscope; sweep means including logic circuits operated by a clock oscillator for producing a substantially linear sweep signal to the horizontal deflection element of the oscilloscope; synchronizing means driven by the clock oscillator for ensuring that the data to the Z-axis of the oscilloscope is produced at the proper time with respect to the sweep signal so as to produce the intended pictorial or graphical image; variable intensity control or regulator means receiving programmed, binary-bit data information from the interface of the computer and, upon command, changing the reference level of the input to the Z-axis of the oscilloscope so as to permit the image to be produced in varying shades of gray; and constantly moving photosensitive recording means disposed opposite the oscilloscope for permanently recording the progressively produced image thereon.

It will be seen that, in addition to the elements listed above, many refinements, improvements and variations are also disclosed and discussed herein.

Figure 1A:
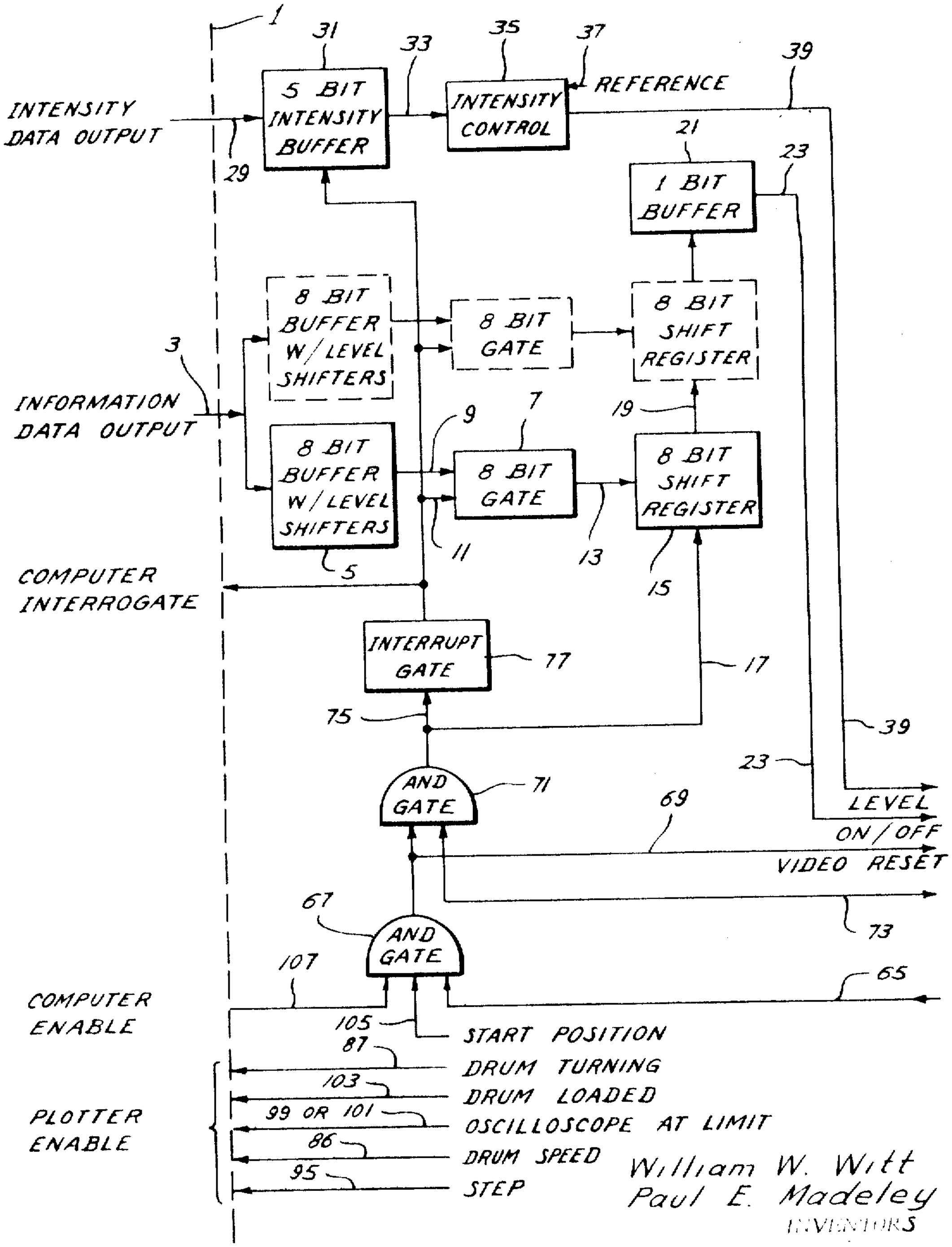
FIGS. 1A and 1B are two halves of an overall block diagram of a preferred embodiment of the invention.
Figure 1B:
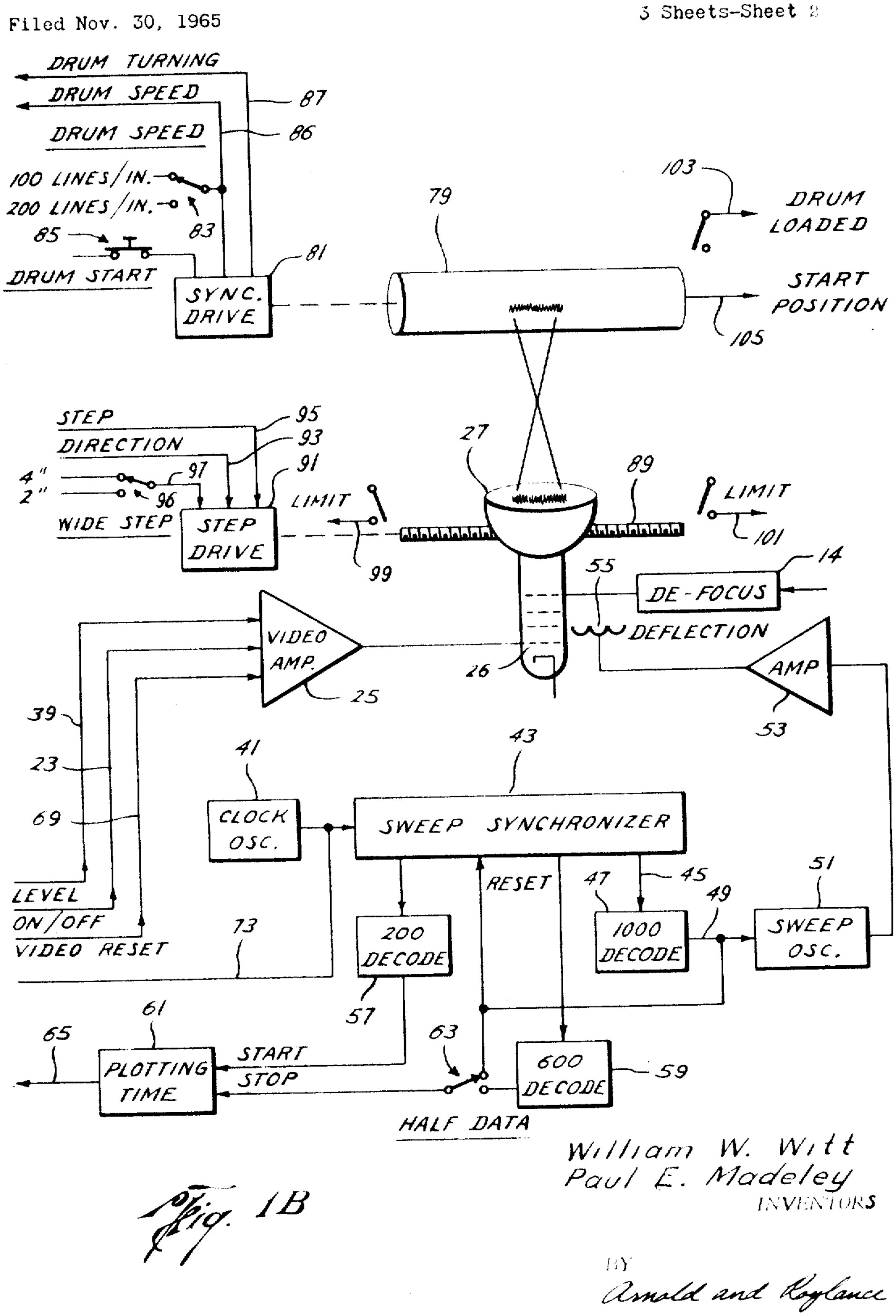

Referring now to the drawings and first to FIGS. 1A and 1B, a block diagram is shown of one practical or preferred arrangement of the equipment constructed in accordance with this invention. An interface 1 is shown, which may be the output interface from a computer or the output from an adapter circuit (not shown) that converts computer data into suitable form for operation with the illustrated embodiment of the invention. In either event, interface 1 may be thought of as being the point at which suitably programmed computer-type data is supplied and into which certain signals are applied into the computer during operation of the plotter circuit. One computer with which the illustrated embodiment of this invention is compatible is the IBM 360. Another is the IBM 1620.

The computer supplies incremental, binary-bit information or data bits on line 3 in the block diagram, which represents four, eight, or sixteen actual lines from the computer, the specific computer being used determining which. For purposes of discussion, it will be assumed that eight lines are supplying such information (as with the IBM 360), unless otherwise specifically noted.

Line 3 is connected to the first circuit of a multi-circuit logic means, this first circuit or buffer storage circuit 5 merely comprising eight distinct and independent storage elements. Each time the computer supplies new information data at interface 1 it supplies all eight data lines at the same time with such data. Therefore, it may be said that the transfer of the data is made in parallel. That is, an eight-count data group is supplied all at once, each count in the group being supplied to the independent receiving and storage element or circuit for that count. A group of eight flip-flop circuits may be conveniently used for the elements in storage circuit 5.

It should be noted that once the eight data bits are transferred, they are impressed in buffer circuit 5 so that even when the input is moved (which might occur while the computer is performing various internal operations), circuit 5 may be interrogated for the stored data information. The data stored in buffer circuit 5 is only changeable by a new data input on line 3.

Level shifters, which may merely be voltage amplifiers, may be employed with each data bit circuit in buffer circuit 5.

The output from buffer circuit 5, which is a multiline output similar to its input, is supplied into an eight-bit gate circuit 7, which may be merely a suitable arrangement of diodes, via line 9. Gate 7 is controlled by conditioning input 11. Only when there is a conditioning input 11, which may be thought of as a command control signal, will gate 7 be open to permit the signal on line 9 to pass therethrough in a parallel manner to output line 13. The occurrence of conditioning or control input 11 is discussed below, but generally a signal 11 occurs every sixteen microseconds.

Therefore, the eight-bit data output from gate 7 is applied via line 13 in parallel to an eight-bit or eight-stage shift register circuit 15. Circuit 15 stores the eight bits of data until a clock pulse shift signal applied to the first stage of the shift register circuit, via line 17, is received. At this time, an output from register circuit 15 is produced. This output is a series output of data bits, i.e., produced one bit at a time, occurring for each clock pulse signal received on line 17. The output from shift register 15 is produced on line 19.

Video buffer circuit 21, which may be merely a flip-flop circuit, receives the signal on line 19, and produces a two-level or on/off output on line 23 in accordance with each successive data bit applied thereto. Since the clock pulse typically occurs every two microseconds the output on line 23 may change that often depending on the programmed data from register 15.

Line 23 is connected to video amplifier 25, which may be the amplifier connected to intensity control grid 26 of an oscilloscope 27. The intensity control circuit including video amplifier 25 is shown connected to intensity control grid 26 of the oscilloscope in FIG. 1B. The control of the spot intensity on the face of the oscilloscope, which may be generally referred to as the Z-axis control, may alternately be achieved by changing the bias on the cathode of the oscilloscope or by changing the bias on a post-anode element thereof.

The on or off level of the input on line 23 determines the condition or non-conduction of amplifier 25 through either an input biasing arrangement or by appropriate gating. The synchronizing of the conduction of this veritical amplifier with the sweep circuit associated with the horizontal deflection circuit of oscilloscope 27 determines the successive positioning of incremental data dots on the face of the oscilloscope and hence the tracing of the ultimate image thereon via these dots. This is explained in detail following the discussion of the sweep circuit operation below.

So as to allow the oscilloscope to have wider versatility of display than merely that which is representable by the presence or non-presence of dots, logic circuit means may be included for controlling the intensity of the dots. Intensity may be controlled when, in addition to the eight bits of information data logic at computer interface 1, there is also intensity logic data available. Typically, this may be in the form of five incremental logic or data bits on five parallel data lines, represented as line 29 in FIG. 1A.

Line 29 is connected into a five-bit logic data storage circuit 31, which may be a five-stage storage circuit, for receiving the intensity data bits in parallel fashion. Also connected into circuit 31 is command control signal 11. Upon each occurrence of signal 11, circuit 31 is interrogated for its stored count, which is applied via line 33 to variable intensity control circuit 35. The output on line 33 is a digital output that may be any one of thirty-two discrete values. Like circuit 5, circuit 31 also allows the input signal to be removed without having an effect on the count stored therein.

Variable intensity control circuit 35, which may be a digital-to-analog converter, has applied to it a steady level DC reference voltage 37. Typically, the converter produces an analog output dependent upon the digital count applied at the input, between ground potential and the reference voltage. Because the digital count is a five-bit count, there are 32 discrete amplitude voltages that may result from variable intensity control circuit 35 as level output 39 therefrom.

Level output 39 is connected at the input of video amplifier 25 along with on/off signal 23 so that when amplifier 25 conducts it does so at a level determined by level 39. This, of course, produces a variable intensity regulation of the succession of data bits. It should be noted, however, that since the output on line 23 from buffer circuit 21 is either on or off at any given time in accordance with the programmed data derived from the data input on line 3, a white dot (absence of a data dot) occurs for a false (off) data output from line 3 regardless of the intensity level logic that may be applied one line 29. When there is a true (on) data output from circuit 21 on line 23 even the whitest of the intensity control levels on line 39 will produce a grayer tone on the face of the oscilloscope than an off data output on line 23 will produce.

Since command control signal 11 is used as the transfer signal for circuit 31, the intensity level changes only every eight bits (or every sixteen mircoseconds). It should be noted, however, that if the intensity data bits were received or transferred from the storage circuit singly, as with the information data bits, a separate intensity level voltage could be produced for every bit. Normally, however, changing the intensity level every eight bits gives all the selectivity or resolution that is required.

A preferred arrangement for the sweep determining or deriving circuit is shown in FIG. 1B. A highly stable clock oscillator 41 producing a signal capable of triggering a logic circuit, applies its output to sweep synchronizer circuit 43. An oscillator having a stability of one part in four hours is typically used, although a stability of less than that may be used without seriously degrading the results. It is suggested that a practical operating period for oscillator 41 is two microseconds, since this develops a display compatible with normal computer operation. Sweep synchronizer circuit 43 may merely be a multi-stage counting circuit, for instance, a ten-stage counter comprised of flip-flop stages. Each pulse or signal from the clock oscillator advances the count in circuit 43 by one count.

Appropriate wiring is made so that when circuit 43 has counted to 500 or for 1,000 microseconds, the circuit is reset to zero and the count is begun again.

Appropriate wiring and/or gating connections are also made so that there is an output connection from the circuit after 200 microseconds (count of 100), after 600 microseconds (count of 300) and after 1,000 microseconds (count of 500), the significance of each being discussed below. These figures are assumed for the preferred mode of operation, which is explained below, although these numbers can be deviated from for a modified type of operation, which is also explained below.

The signal produced after 1,000 microseconds from circuit 43 is applied via line 45 to 1000 decode circuit 47, which may be a gate means such as a diode matrix appropriately wired to produce an output on line 49 at the count of 500. Line 49 may be applied as the reset signal to synchronizer circuit 43, as explained above. This output is also applied as a trigger signal to sweep oscillator circuit 51, which may be a typical ramp generator circuit producing an approximate sawtooth wave to the horizontal orthogonal deflection element or yoke 55 of oscilloscope 27. The output from sweep oscillator 51 may be applied through a horizontal amplifier 53 before being applied to the deflection yoke 55 of oscilloscope 27.

Actually, a pure sawtooth wave is very difficult to achieve, the waveform being somewhat unreliable at its leading edge following a transition from its lowest level to its highest level. The initial portion of the signal from oscillator 51 following a trigger signal from circuit 47 is a rapidly rising leading edge that reaches a maximum amplitude and then begins to decay in ramp-like manner. It has been discovered that within at least 200 microseconds following excitation, the ramp signal is on the linear downgrade sloping portion of the ramp. This linear portion continues until the next succeeding trigger is received and a new maximum is established. By this triggering scheme, the period of a cycle of the output from oscillator 51 is 1000 microseconds, there being a linear ramp portion of at least the last 800 microseconds. Hence, the oscillator frequency may be said to be 1 kc.

In addition to the selection of a 1,000-microsecond signal from synchronizer circuit 43 via 1000 decode circuit 47, similar circuits 57 and 59 may select a 200-microsecond signal and a 600-microsecond signal. The 200-microsecond signal from 200 decode circuit 57 is applied as a switching input or start signal to plotting time circuit 61, which may be a flip-flop. Another plotting time circuit switching input or stop signal, the output from 1000 decode circuit 47 or from 600 decode circuit 59 as selected by half-data switch 63, determines when the output from plotting time circuit 61 is terminated. That is, there is an output between the time the 200-microsecond signal is received and the time the 600- or 1,000-microsecond signal is produced. The selection of the output from the 600 decode circuit or from the output from the 1000 decode circuit as the stop signal to the plotting time circuit is discussed below. But, it should be noted that in either case, the output from the plotting time circuit coincides with a linear output portion from the sweep oscillator.

The sweep deriving circuit just described provides two data synchronizing signals to the data logic circuit previously described. The first is output 65 from plotting time circuit 61. When the interval is reached between 200 and 1,000 microseconds (or 600 microseconds), output 65 is applied to AND gate 67 to allow the data logic circuit to function as described, provided the other enabling inputs to gate 67 are present. The nature of these other inputs is discussed below.

When conditions are proper for the overall pictorial plotter shown in FIGS. 1A and 1B to operate (as indicated by the enabling inputs to gate 67) and there is a signal 65, then an output 69 is produced from gate 67 to amplifier 25. This signal may be applied either through an AND gate with on/off signal 23 or it may be applied as an enabling bias signal for amplifier operation. In either event, the signal allows the amplifier to operate as previously described only provided there is a signal 69 present.

In addition, 69 is supplied to AND gate 71 along with clock oscillator output 73 from oscillator 41. Therefore, when there is an output 65 and all other enabling signals are applied to gate 67, there is a signal 75 from gate 71 at the occurrence of each output 73. Signal 75 is the same shift signal 17 applied to register 15 for causing the signal therein to be produced out in a series-like fashion.

Signal 75 is also supplied to an interrupt gate 77, which may merely be a repetition counter circuit for counting to the count of eight. When a count of eight is reached, then interrupt gate 77 produces signal 11, causing the information data bits stored in circuit 5 to be transferred through gate 7 to register 15 and causing the intensity data bits stored in circuit 31 to be applied as a digital data count to variable intensity control 35.

Signal 11 also is a convenient signal to apply back to interface 1 of the computer for forming the basis of transferring the data information from the storage element of the computer to lines 3 and 29. Of course, appropriate delaying circuits must be included in the computer, so that the information applied to these lines to change the counts stored in circuits 5 and 31 occurs slightly before the subsequent signal 11 is applied. A one or two microsecond time gap is sufficient, although a much greater gap may be used if desired. Since there is a fixed period between the recurring cycles of signal 11, by using signal 11 for timing the internal data transferring operation of the computer, there is no need to use an external or synchronized oscillator source for such purpose.

The mechanical portion of the plotter apparatus comprises generally a constantly moving photosensitive means such as a recording medium on drum 79 and a light source means such as oscilloscope 27 disposed effectively thereopposite and having a face illumination sufficiently bright that images thereon are recordable on the recording medium. In a preferred embodiment of this invention, the peripheral surface of drum 79 is set to move at a uniform speed or rate of ten inches per second, as driven by synchronous drive unit 81. The drum speed may be selected by a switch 83 (normally to the 100-lines-per-inch position) and the drive motor supplied power through a drum start switch 85. A monitoring signal 87 may be produced only when the drum is turning and a monitoring signal 86 may be produced only when the drum is turning at a proper speed by any convenient means, which signal may be used as an enabling signal, as is described below.

Wrapped around the periphery surface of the drum may be either a photosensitive paper or film, which may produce either a negative or positive image when exposed to the reflected image from the face of the oscilloscope. The recording medium is typically pre-cut to size, placed or loaded on the cylindrical drum surface and held with clamps (not shown) at either end thereof. The vicinity where the ends of the medium come together or come close together is referred to as the drum splice. The image produced on the recording medium is the permanent recording or ultimate output from the entire plotter.

Oscilloscope 27 is mounted for movement via a lead screw 89 and may be disposed either to direct the image appearing on its face directly to the surface of drum 79 or through an optical arrangement. This optical system may provide for an optical gain or reduction of the image as desired, but in the preferred embodiment shown, it is assumed that the image is recorded on a one-to-one ratio. The lead screw is driven by a step drive motor 91, which receives instruction signals in the form of a direction signal 93 (direction of step movement longitudinally with respect to the lead screw), a step signal 95 (occurring when stepping is desired), and a wide step signal 97. The wide step signal may be set in the preferred embodiment of this invention to select a signal that steps the oscilloscope either two inches or four inches. When the oscilloscope is at an extreme end position along its line of travel, a limit switch, either 99 or 101 at either end, closes and emits a signal. Depending upon the intended direction of travel, one of these signals may be used as a monitoring enabling signal, as described below.

There may be other signals established than those previously mentioned when various proper operating conditions are established. These may be, for instance, the drum loaded signal 103 and start position signal 105. The drum loaded signal is produced when there is an indication that there is paper or film wrapped around the periphery of the drum and secured in place. The start position signal is produced when the drum rotates so that the image reflects on the periphery of the drum at the desired initial or starting point for plotting the image, normally just past the longitudinal splicing point where the paper or film is loaded and secured to the drum.

The plotter is not ready to begin receiving the programmed information from the computer until various conditions are satisfied, namely, until the drum is loaded, the drum is turning and turning at the proper speed, the oscilloscope is at the proper limit position along the lead screw, the oscilloscope is not in the process of being stepped (as is explained later), and the oscilloscope is initially positioned to reflect its image to the point on the periphery of the drum that is desired. Therefore, signals monitoring each of these conditions may be supplied to interface 1 of the computer. When all of these signals indicate proper conditions for the data to be received and the plot to begin, then the computer is enabled. It may be noted that the start position signal may be produced slightly ahead of when the start point is reached to allow for a slight delay in the production of a recordable image. When the plotter monitored conditions and the conditions in the computer are proper, a computer enable signal may be supplied back from the computer at interface 1 and supplied as computer enable signal 107 to AND gate 67.

Alternately to supplying some of these monitoring signals back to the computer interface as described, start position signal 105 (and possibly others) may be supplied directly to AND gate 67, as shown in FIG. 1A. It should be noted that not until such a signal is applied will there be an output from this AND gate, an output from AND gate 71 and an output from interrupt gate 77. Since the output from gate 77 is the signal that causes the computer information to be transferred to lines 3 and 29, the computer interrogation does not start until start position signal 105 is applied.

In operation, cylindrical drum 79 is loaded with the appropriate recording medium (a procedure requiring approximately two or three minutes), drum speed switch 83 is set to the appropriate position (normally, this is the 100-lines-per-inch position, which is equivalent to a ten-inches-per-second turning rate), and oscilloscope 27 is set to its appropriate limit. In the assumed eight-bit data information situation, wide step switch 96 is set for four inches so that the four-inch stepping signal will be supplied to step drive motor 91. Again, assuming the eight-bit data situation, half-data switch 63 is set to select the output from 1000 decode circuit 47.

After warmup of the equipment, and after the drum turns so that drum 79 is appropriately positioned to produce a start position signal 105, the plotting begins. With the selection of every eighth signal from clock oscillator 41 by gate 77, successive groups of eight bits of data are transferred into storage circuit 5 and out again into register 15 in parallel manner and at appropriate time relation (that is, so that new data is moved into register 15 after the last bit is removed therefrom). The shift signal on line 17 successively removes the data bits in series fashion from register 15 and applies these to video amplifier 25 via an on/off circuit 21. The timing of the occurrence of the "on" data bits is synchronized or coordinated with the sweep generation circuit to produce the programmed image on the face of the oscilloscope. At the same time, intensity data bits are received from the computer interface and changed to an analog voltage for varying the signal input to amplifier 25 and hence the intensity of the dots produced on the face of the oscilloscope. The intensity circuit is interrogated with every output from gate 77 and hence can change in intensity output every sixteen microseconds.

By this method a four-inch image is produced on the face of the oscilloscope 27, which is, in turn, reflected to the surface of the rotating drum. Since 400 signals occur from oscillator 41 during the on time of plotting time circuit 61, 400 data bits are produced for each millisecond sweep cycle. This means there are 100 bits per inch if the typical image projection of one-to-one is assumed. During one sweep trace, there are fifty cycles of information data bit groups transferred to amplifier 25 ($50\times8=400$), at which time the plotting time circuit is stopped (during retrace of the sweep). After the sweep trace is satisfactorily re-established as described above, then the plotting time output again permits a new plotting of data points.

The four-inch strip thus formed is produced on the drum surface starting just to one side of the drum splice and extending until a short distance is reached to the other side of the drum splice (typically 90 percent of the periphery of the drum is utilized), at which time the start position signal 105 is removed and a step signal 95 is sent to step drive motor 91. At this time, which is after typically 6,000 groups of 400 bits, the computer removes computer enable signal 107 and assuming that the wide step switch is set to the four-inch position, appropriate signals are applied to step drive motor 91 to cause the oscilloscope to step via the lead screw to which it is mounted by four inches. Following the re-establishment of computer enable signal 107, a new strip is produced next to the one just completed. This process is repeated until the whole image is completed. By looking at the finished image that is recorded there is no indication that it is developed or prepared in strips.

Figure 2:
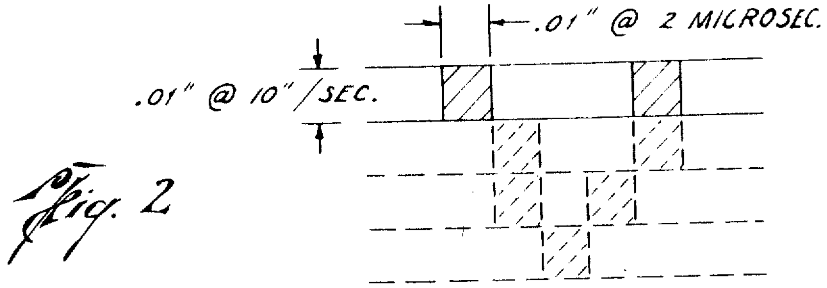
FIG. 2 is a graphical presentation of the grid pattern developed by the preferred embodiment of the invention shown in FIGS. 1A and 1B.

FIG. 2 shows the typical grid pattern of a signal data dot developed on the face of the oscilloscope. Assuming that the peripheral drum speed is set to 10 inches per second (.01 inch per millisecond), that the sweep rate of the oscilloscope is 1 kc. (1,000 microseconds per sweep) and that a data dot is capable of being newly produced every two microseconds, the dot developed is a .01-inch by .01-inch grid. Of course, there is a slight rounding of the corners in actual practice, but generally this may be considered the basic grid. It may be seen that any image that may be simulated by the arrangement of the dots and their shading (variable intensity) is capable of being produced, as shown by the dotted dots on subsequent sweeps in FIG. 2.

Figure 3:
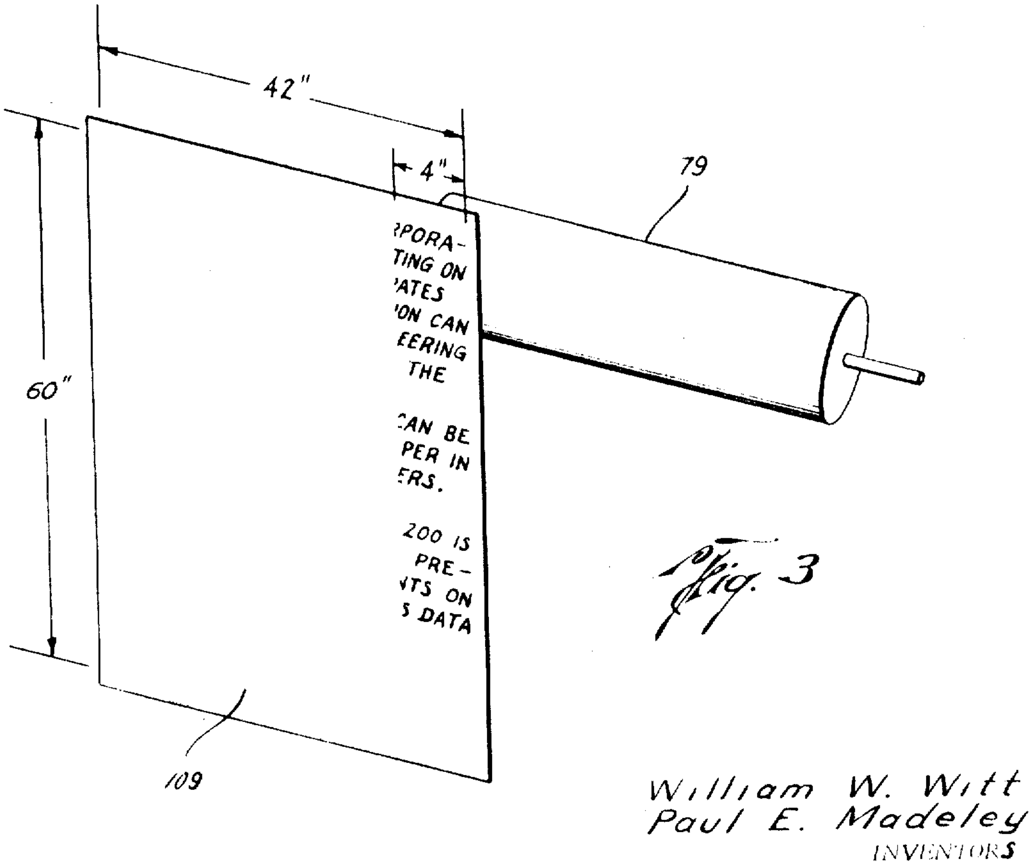
FIG. 3 is an exploded isometric diagram of a recording medium that may be used with the preferred embodiment of the invention shown in FIGS. 1A and 1B, showing the image partially developed.

FIG. 3 shows the typical production of the image on the recording medium. The drum may have a typical length for receiving a pre-cut recording medium 190 capable of producing an image that is 42 inches by 60 inches. The image, which may be merely text in clear language as shown, is typically produced in successive four-inch strips. It may be noticed that the programming may be such that the successive strips are produced in either a left to right direction or, again as shown, in a right to left progression.

Hence, normally the data points are recorded on the recording medium in the following format: 400 data points in a horizontal line are recorded in vertical strips four inches wide to produce an overall image 42 inches wide by 60 inches long (the last strip being only a two-inch strip).

After the data image is plotted on the recording medium, normally a wet process requiring developer and fixer with the necessary rinse baths is required to make the image readable.

Other features that may be provided are a de-focus circuit 111, which may have either a manual or automatic control for defocusing the oscilloscope so that the image produced has a blended effect, the individual dots being made less prominent. Typically, such control allows the oscilloscope to de-focus each dot to twice its normal diameter.

As already mentioned the data supplied from the computer may not arrive on eight lines, but may instead arrive on four lines. In this event, it is convenient to make a two-inch strip rather than a four-inch strip by merely switching half-data switch 63 to the 600 decode position and the wide step switch 96 to produce a two-inch step signal 97. When this is done, the entire sweep cycle is still 1,000 microseconds, but the output from plotting time circuit 61 is reduced to a 400-microsecond output for each sweep duration, between the 200 and the 600 outputs from sweep synchronizer circuit 43.

Should the input arrive on sixteen lines instead of eight, then a series combination of additional circuits 5, 11 and 15 must be included in the plotter circuit, as shown in dotted lines, in parallel with the three original circuits. Also, interrupt gate 77 is set to produce an output with every sixteenth signal 75 applied thereto (every thirty-two micro-seconds) rather than with every eighth signal 75. This may be easily accomplished by having gate 77 be a counter capable of counting to sixteen with a switch (not shown) that may be set to reset the counter after eight counts when desired. When a signal is produced from gate 77 every sixteen microseconds rather than every eight, the computer is freed for other operations for a greater period of time (interrogated for data only 25 times per millisecond), but otherwise the production of data to the oscilloscope remains the same.

It should also be noticed that there is an alternate to the 100-lines-per-inch drive speed at which the drum may be driven. This is a 200-lines-per-inch speed, or a drum surface speed of five inches per second. The slower speed may be selected, along with a two-to-one optical reduction in projecting the image from the oscilloscope when a greater resolution of the data dots is desired. Also, because there is a compacting of the recorded data on the recording medium, more programmed data may be plotted in the same area.

It will be recognized that preferred operating conditions have been discussed. It may be that for any particular application one or more of decode circuits 47, 57 and 59 is set to produce an output at times other than those indicated. Depending on the settings made, a different sweep length may be selected or a different plotting time within the sweep length may be selected.

While a preferred embodiment of the invention has been illustrated and described, it is obvious that various substitutes or modifications of structure may be made, some of which have also been discussed, without varying from the scope of the invention.

We claim:

1. An apparatus for pictorially displaying incremental programmed, binary-type data from the output interface of a computer comprising:

logic circuit means receiving and storing said data and providing control signals corresponding to said data;

a rotatably mounted recording means having a photosensitive surface, said recording means constantly rotating when images are recorded on said surface;

an oscilloscope disposed opposite to said recording means and having a face illumination sufficiently bright that images thereon are recorded on said recording means, said oscilloscope having an orthogonal deflection element responsive to a sweep signal, and an intensity control element for controlling the brightness of said images;

clock oscillator means for determining the time when the sweep signal is applied to said orthogonal deflection element;

means coupling said logic circuit means to at least said intensity control element;

said oscillator means comprising synchronizing means for causing the data stored in said logic circuit means to sequentially apply said control signals to said intensity control element, said synchronizing means synchronizing said sweep signal with said control signals and with the motion of said recording means.

2. Apparatus in accordance with claim 1, wherein said logic circuit means comprises:

storage circuit means for receiving a fixed number of the incremental programmed, binary-type data in parallel and storing said data, and shift register means connected to said storage circuit means for receiving a fixed number of incremental data in parallel, said shift register means also connected to said oscillator means, and producing an incremental data series output to said intensity control element for a predetermined integral number of cycles from said oscillator means.

3. Apparatus in accordance with claim 2, and including:

a counter circuit connected to said oscillator means for producing a recurring output signal having a repetition cycle equal to said fixed number of incremental data received by said shift register times the operating period of said oscillator means, said output causing data to transfer from said storage circuit means to said shift register means.

4. Apparatus in accordance with claim 1, wherein:

said oscillator means produces an output for every predetermined number of microseconds, and said logic circuit means comprises storage circuit means for receiving a fixed number of the incremental programmed, binary-type data and in parallel and storing said data, shift register means connected to said storage circuit means for receiving a fixed number of incremental data in parallel, said shift register means also connected to said oscillator means, and producing an incremental data series output to said intensity control element for a fixed number of outputs from said oscillator means.

5. Apparatus in accordance with claim 1, wherein said logic circuit means comprises:

storage circuit means for receiving a fixed number of the incremental programmed, binary-type data in parallel and storing said data, gate means connected to said storage circuit means for passing the stored data in said storage circuit means therethrough upon command, shift register means connected to said gate means for receiving a fixed number of incremental data in parallel from said storage circuit means through said gate means, a counter circuit connected to said oscillator means for producing a recurring command output signal having a repetition cycle equal to the fixed number of incremental data received by said shift register times the cycle duration of said oscillator means, said counter circuit connected to said gate means for transferring data from said storage means to said shift register means, and said shift register means receiving the output from said oscillator means and producing an incremental data series output to said intensity control element for a predetermined number of cycles from said oscillator means.

6. Apparatus in accordance with claim 1, wherein said recording means includes a drum for supporting said photosensitive surface.

7. Apparatus in accordance with claim 1, and including:

means for displacing said oscilloscope to at least another position for producing a second group of images next to said previously produced images so that the overall effect is a single composite image.

8. Apparatus for pictorially displaying incremental programmed, binary-type data from the output interface of a computer, comprising:

logic circuit means receiving and storing said data and providing control signals corresponding to said data;

a rotatably mounted recording means having a photosensitive surface, said recording means constantly rotating when images are recorded on said surface;

an oscilloscope disposed opposite to said recording means and having a face illumination sufficiently bright that images thereon are recorded on said recording means, said oscilloscope having an orthogonal deflection element responsive to a sweep signal, and an intensity control element for controlling the brightness of said images;

means for effecting relative movement between said recording means and said oscilloscope;

clock oscillator means for determining the time of the sweep signal applied to said orthogonal deflection element;

said logic circuit means being coupled to at least said intensity control element;

said oscillator means comprising synchronizing means for causing the data stored in said logic circuit means to sequentially apply said control signals to said intensity control element, said synchronizing means synchronizing said sweep signal with said control signals;

whereby a pictorial presentation is progressively recorded on said photosensitive surface of said recording means.

9. Apparatus in accordance with claim 8, wherein said means for effecting relative movement between said recording means and said oscilloscope does so at a substantially uniform rate.

10. Apparatus in accordance with claim 8, wherein the data is stored in said logic circuit means to sequentially produce an image spot for each binary-data bit of a first state and not to produce an image spot for each binary-data bit of the other binary-data state.

11. Apparatus in accordance with claim 8, and including:

intensity control logic circuit means for receiving and storing incremental programmed, binary-type data containing intensity control data applied to said intensity control element and, said oscillator means causing the intensity control data stored in said intensity control logic circuit means to change the intensity of the produced image.

12. Apparatus in accordance with claim 11, wherein said intensity control logic circuit means comprises:

another logic circuit means for receiving and storing said intensity control data in parallel, a digital-to-analog converter circuit connected to the output of said last-named logic circuit means, said converter circuit being also connected to a steady-state voltage reference level, thereby producing an intensity control output signal.

13. An apparatus for pictorially representing intelligence data provided by a computer in binary digits, the combination comprising:

data storage means for storing output data from said computer;

a transducer having at least one control element for receiving control signals, said transducer being adapted to emit a movable beam of electromagnetic rays, said beam being controllable by said control signals;

a rotatably mounted recording medium having a surface responsive to said rays, said recording medium constantly rotating when images are recorded on said surface;

beam control means coupled to said control element for providing said control signals;

logic circuit means for transferring groups of binary digits from said storage means to said beam control means; and synchronizing means adapted to synchronize the motions of said movable beam and said recording medium with said beam control means and said logic means, thereby causing said transducer to impinge upon said surface groups of discrete beams corresponding to said groups of binary digits, said groups of discrete beams being displayed on said surface.

14. The apparatus of claim 13 wherein said transducer is an oscilloscope emitting a beam of light rays, and said surface is photosensitive.

15. The apparatus of claim 14 wherein said oscilloscope includes at least one orthogonal deflecting element responsive to a sweep signal for deflecting said beam in a substantially horizontal direction, and further includes at least one intensity control element responsive to said control signals for controlling the formation and intensity of said beam.

16. The apparatus of claim 15 wherein said recording medium is mounted on a rotatable cylindrical drum the rotation of which is synchronized with said sweep signal by said synchronizing means.

17. The apparatus of claim 16 wherein said beam is formed only in response to at least one incoming binary digit of a predetermined state.

18. The apparatus of claim 16 wherein the intensity of said beam is controllable by said logic circuit means in response to intensity control data provided by said computer.

19. The apparatus of claim 14 wherein said oscilloscope is movable in discrete steps.

References Cited

UNITED STATES PATENTS

| | | | |
|---|---|---|---|
| 2,596,741 | 5/1952 | Tyler et al. | |
| 3,323,119 | 5/1967 | Barcomb et al. | 340—172.5 |
| 3,325,786 | 6/1967 | Shashoua et al. | 340—324.1 |
| 3,336,587 | 8/1967 | Brown | 340—324.1 |
| 3,348,229 | 10/1967 | Freas | 340—324.1 |
| 2,920,312 | 1/1960 | Gordon et al. | 340—174 |
| 3,036,291 | 5/1962 | Whittle et al. | 340—172.5 |
| 3,067,407 | 12/1962 | Schaaf | 340—173 |
| 3,124,784 | 3/1964 | Schaaf et al. | 340—173 |
| 3,144,637 | 8/1964 | Adams et al. | 340—172.5 |
| 3,165,045 | 1/1965 | Troll | 95—4.5 |

ROBERT C. BAILEY, Primary Examiner

H. E. SPRINGBORN, Assistant Examiner

U.S. Cl. X.R.

340—324.1